(12) United States Patent
Su et al.

(10) Patent No.: US 6,759,643 B2
(45) Date of Patent: Jul. 6, 2004

(54) AUTOMATIC SUNSHADE CURTAIN WITH SUSTAINED STATE AT TRANSITION

(75) Inventors: Wen-Wei Su, Taoyuan (TW); Kuei-Hung Chen, Taoyuan (TW); Shun-Hsiang Hsiao, Taoyuan (TW)

(73) Assignee: Exon Science, Inc. (TW)

( * ) Notice: Subject to any disclaimer, the term of this patent is extended or adjusted under 35 U.S.C. 154(b) by 160 days.

(21) Appl. No.: 09/945,882

(22) Filed: Sep. 4, 2001

(65) Prior Publication Data

US 2003/0042398 A1 Mar. 6, 2003

(51) Int. Cl.[7] ............................................... H01J 40/14
(52) U.S. Cl. .............................. 250/214 AL; 359/601; 296/97.1
(58) Field of Search ........................ 250/214 AL, 221, 250/203.4; 359/601, 610; 296/97.1, 97.4

(56) References Cited

U.S. PATENT DOCUMENTS 3,226,151 A  * 12/1965  Reuther ..................... 296/97.4
5,663,621 A  *  9/1997  Popat ....................... 250/203.4
5,715,093 A      2/1998  Schierbeek et al. ......... 359/601

* cited by examiner

*Primary Examiner*—Thanh X. Luu
(74) *Attorney, Agent, or Firm*—Volpe and Koenig, P.C.

(57) ABSTRACT

A light-responsive controlling device for automatically controlling a headlamp and/or a sunshade curtain is disclosed. The control device includes a photo-sensor mounted on a vehicle for generating a sensing signal in response to the intensity of an environmental light, a discriminating circuit electrically connected to the photo-sensor for optionally generating a triggering signal according to a comparing result of the sensing signal with a reference signal, a hold circuit electrically connected to the discriminating circuit for outputting a confirming signal in response to the triggering signal uninterrupted for a predetermined period, and a drive circuit electrically connected to the hold circuit and a headlamp or a sunshade curtain of the vehicle for providing a drive current in response to the confirming signal for the headlamp to emit a certain level of light or for the sunshade curtain to perform opening/closing operations.

9 Claims, 6 Drawing Sheets

AUTOMATIC SUNSHADE CURTAIN WITH SUSTAINED STATE AT TRANSITION

FIELD OF THE INVENTION

The present invention relates to a control device, and more particular to a light-responsive control device for automatically controlling a headlamp and/or a sunshade curtain of a vehicle.

BACKGROUND OF THE INVENTION

Intense sunlight often bothers the driving operation of a driver, and makes the passengers seated in the vehicle uncomfortable. Therefore, various sunshade curtains are developed to solve this problem. Most of the sunshade curtains are manually attached to and detached from the side windows and/or rear windscreen to avoid direct radiation of sunlight. In some luxurious cars, a semi-automatic sunshade curtain is equipped for blocking sun from the rear windshield. That is, it requires the driver to push a button manually, and the sunshade curtain automatically ascends or descends.

On the contrary to the situation of intense sunlight, a situation of weak light in daytime should also be taken into consideration. In general, the headlamp of a vehicle will not be switched on in daytime. When sunlight suddenly becomes weak for example owing to a tunnel, clouds or rains, and the driver forgets to activate the headlamp, it may results in danger for driving. A conventional automatic headlamp activating system includes a photo-responsive sensor disposed on the dashboard and oriented upwards for detecting the intensity of sunlight. Once the sunlight becomes weak, the headlamp is automatically activated immediately. This conventional automatic headlamp activating system, however, has a disadvantage that the headlamp is possibly required to be activated and deactivated within an extremely short period. For example, when the vehicle with the automatic headlamp activating system is traversing under a viaduct, the upward photo-sensor will inform the control circuit of low light intensity so as to automatically activate the headlamp. When the photo-sensor is out of the viaduct range, the control circuit will deactivate the headlamp. However, the period for driving across a viaduct is generally very short. It means that the headlamp will be deactivated soon after it is activated. This operational mode is harmful to the lifespan of the headlamp. Thus, another conventional automatic headlamp activating system has the photo-sensor mounted on the interior rearview mirror and oriented forwards to solve this problem. For the prior art, the headlamp, once activated, has only one option in its intensity. Therefore, the energy consumption is not properly controlled.

SUMMARY OF THE INVENTION

Therefore, an object of the present invention is to provide a light-responsive control device for automatically controlling the activation of a vehicular headlamp, which performs a confirmation function to avoid mis-operation.

Another object of the present invention is to provide a light-responsive control device for automatically controlling the activation of a vehicular headlamp, which performs 4-level or above headlight control for dynamically compensating the insufficient illumination.

A further object of the present invention is to provide a light-responsive control device for automatically controlling a vehicular sunshade curtain.

A still further object of the present invention is to provide a light-responsive control device, which uses a single photo-sensor to perform the automatic control of a vehicular headlamp and a vehicular sunshade curtain.

A first aspect of the present invention relates to a light-responsive control device for automatically controlling a headlamp of a vehicle. The control device includes a photo-sensor mounted on the vehicle for generating a sensing signal in response to the intensity of an environmental light; a discriminating circuit electrically connected to the photo-sensor for optionally generating a first triggering signal according to a comparing result of the sensing signal with a first reference signal; a hold circuit electrically connected to the discriminating circuit for outputting a first confirming signal in response to the first triggering signal uninterrupted for a predetermined period; and a drive circuit electrically connected to the hold circuit and the headlamp of the vehicle for providing a drive current in response to the first triggering signal for the headlamp to emit a certain level of light.

Preferably, the photo-sensor is disposed at an interior rearview mirror of the vehicle, and oriented to receive a forward light as the environmental light.

Preferably, the discriminating circuit includes at least a first comparing unit for comparing the sensing signal with the first reference signal. For example, the discriminating circuit further includes a second, a third and a fourth comparing units for comparing the sensing signal with a second, a third and a fourth reference signals, respectively, and optionally generating a second, a third and/or a fourth triggering signals according to respective comparing results.

In an embodiment that the discriminating circuit includes four comparing units as mentioned above, the drive circuit includes a constant voltage source; a load resistor having a first end thereof electrically connected to the constant voltage source in series; a first, a second, a third resistors having first ends thereof electrically connected to a second end of the load resistor; a first controlled switch electrically connected to the discriminating circuit, a second end of the first resistor, and ground for serially connecting the first resistor to ground in response to the first triggering signal; a second controlled switch electrically connected to the discriminating circuit, a second end of the second resistor, and ground for serially connecting the second resistor to ground in response to the second triggering signal; a third controlled switch electrically connected to the discriminating circuit, a second end of the third resistor, and ground for serially connecting the third resistor to ground in response to the third triggering signal; and a fourth controlled switch electrically connected to the discriminating circuit, the second end of the load resistor, and ground for serially connecting the load resistor to ground in response to the fourth triggering signal; wherein a common node of the second end of the load resistor and the first ends of the first, second and third resistors serves as a voltage output end for outputting a drive voltage signal of one of a first, a second, a third and a fourth levels according to a conduction combination of the first, second, third and fourth controlled switches.

Preferably, the drive circuit further includes a field effect transistor electrically connected to the voltage output end for providing the drive current of one of a first, a second, a third and a fourth levels for the headlamp in response to the drive voltage signal.

A second aspect of the present invention relates to a method for automatically controlling an activation state of a headlamp of a vehicle. The method includes steps of: generating a sensing signal in response to the intensity of an environmental light; comparing the sensing signal with a reference signal to optionally generate a triggering signal; and providing a drive current for the headlamp if the triggering signal is generated and uninterrupted for a predetermined period.

Preferably, the predetermined period is no less than 0.1 second, and more preferably, about 0.5 second.

A third aspect of the present invention relates to a light-responsive control device for automatically switching illumination levels of a headlamp of a vehicle. The control device includes a photo-sensor mounted on the vehicle for generating a sensing signal in response to the intensity of an environmental light; a plurality of comparing units electrically connected to the photo-sensor for comparing the sensing signal with a corresponding number of reference signals to optionally generate respective triggering signals; and a drive circuit electrically connected to the plurality of comparing units and the headlamp of the vehicle for providing a drive current for the headlamp to emit a light having an illumination level corresponding to the drive current in response to the respective triggering signals.

Preferably, the control device further includes a hold circuit electrically connected between the plurality of comparing units and the first drive circuit for holding the respective triggering signals until the comparing results are kept unchanged for a predetermined period.

Preferably, the photo-sensor is disposed at an interior rearview mirror of the vehicle, and oriented to receive a forward light as the environmental light.

In an embodiment, the plurality of comparing unit includes a first, a second, a third and a fourth comparing units for comparing the sensing signal with the corresponding number of reference signals including a first, a second, a third and a fourth reference signals, respectively, and optionally generating a first, a second, a third and/or a fourth triggering signals according to respective comparing results. The drive circuit includes a constant voltage source; a load resistor having a first end thereof electrically connected to the constant voltage source in series; a first, a second, a third resistors having first ends thereof electrically connected to a second end of the load resistor; a first controlled switch electrically connected to the first comparing unit, a second end of the first resistor, and ground for serially connecting the first resistor to ground in response to the first triggering signal; a second controlled switch electrically connected to the second comparing unit, a second end of the second resistor, and ground for serially connecting the second resistor to ground in response to the second triggering signal; a third controlled switch electrically connected to the third comparing unit, a second end of the third resistor, and ground for serially connecting the third resistor to ground in response to the third triggering signal; and a fourth controlled switch electrically connected to the fourth comparing unit, the second end of the load resistor, and ground for serially connecting the load resistor to ground in response to the fourth triggering signal; wherein a common node of the second end of the load resistor and the first ends of the first, second and third resistors serves as a voltage output end for outputting a drive voltage signal of one of a first, a second, a third and a fourth levels according to a conduction combination of the first, second, third and fourth controlled switches. The drive circuit further includes a field effect transistor electrically connected to the voltage output end for providing the drive current of one of a first, a second, a third and a fourth levels for the headlamp in response to the drive voltage signal.

A fourth aspect of the present invention relates to a light-responsive control device for automatically controlling a sunshade curtain of a vehicle. The control device includes a photo-sensor mounted on the vehicle for generating a sensing signal in response to the intensity of an environmental light; a discriminating circuit electrically connected to the photo-sensor for generating a triggering signal in response to a first comparing result of the sensing signal with a reference signal, and a second triggering signal in response to a second comparing result of the sensing signal with the reference signal; and a drive circuit electrically connected to the discriminating circuit and a motor for opening the sunshade curtain of the vehicle in response to the first triggering signal, and closing the sunshade curtain in response to the second triggering signal.

In an embodiment, the drive circuit includes a relay unit electrically connected between the discriminating circuit and the motor for changing revolving directions of the motor in response to the first and second triggering signal, respectively, so as to open/close the sunshade curtain.

Preferably, the light-responsive control device further includes a hold circuit electrically connected between the discriminating circuit and the drive circuit for holding the second triggering signal until the second comparing result is kept unchanged for a predetermined period.

Preferably, the light-responsive control device further includes a switch electrically connected between the first discriminating circuit and the first drive circuit for switching the sunshade curtain among a manually opening, a manually closing and an automatically opening/closing states.

Preferably, the light-responsive control device further includes a switch electrically connected between the first drive circuit and the motor for manually suspending revolution of the motor.

A fifth aspect of the present invention relates to a method for automatically switching a sunshade curtain of a vehicle between an open state and a closed state. The method includes steps of comparing the intensity of an environmental light with a first and a second threshold values; generating an open-state triggering signal when the intensity of the environmental light is greater than the first threshold value; generating a closed-state triggering signal when the intensity of the environmental light is less than the second threshold value; generating a confirmed closed-state triggering signal when the intensity of the environmental light is no greater than the first threshold value but no less than the second threshold value for a predetermined period; switching the sunshade curtain to the open state in response to the open-state triggering signal; and switching the sunshade curtain to the closed state in response to either of the closed-state triggering signal and the confirmed closed-state triggering signal.

The first and second threshold values, for example, are 4000 Lux and 300 Lux, respectively. An example of the predetermined period is about 5 minutes.

For all the aspects of the present invention, a common photo sensor is preferably used for acquiring an environmental light intensity for all purposes.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
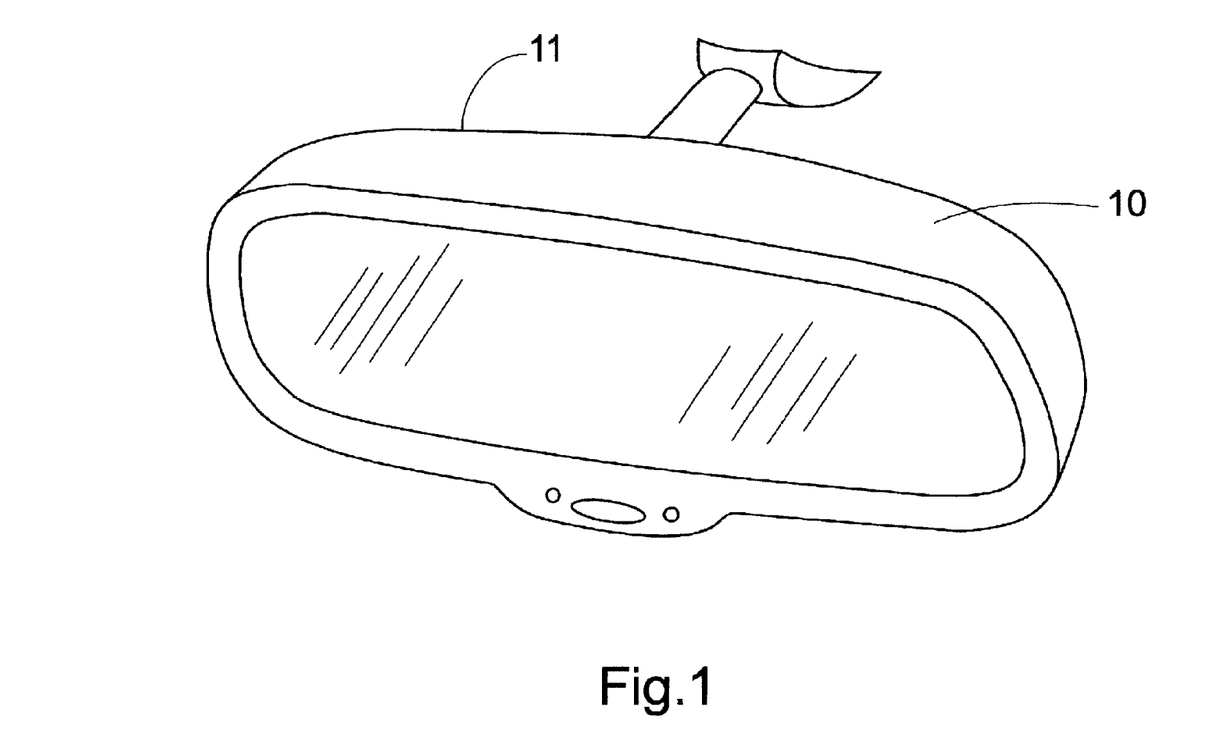
FIG. 1 is a schematic diagram illustrating a mounting position of a photo-sensor of a control device according to the present invention.

In order to allow the headlamp of a vehicle to be automatically activated at dusk, and allow an electro-mechanical sunshade curtain equipped in the vehicle to be automatically opened and closed, a photo-sensor 11 is mounted on the vehicle, for example disposed at the interior rearview mirror 10 and oriented forwards, as shown in FIG. 1, for monitoring the environmental conditions. The photo-sensor S1 can be a photo-responsive resistor. The photo-sensor detects the intensity of the environmental light dynamically, and informs the respective drive circuits of the headlamp and sunshade curtain to properly activate the corresponding operations. Hereinafter, the related operations of the headlamp and sunshade curtain are separately described.

Figure 2:
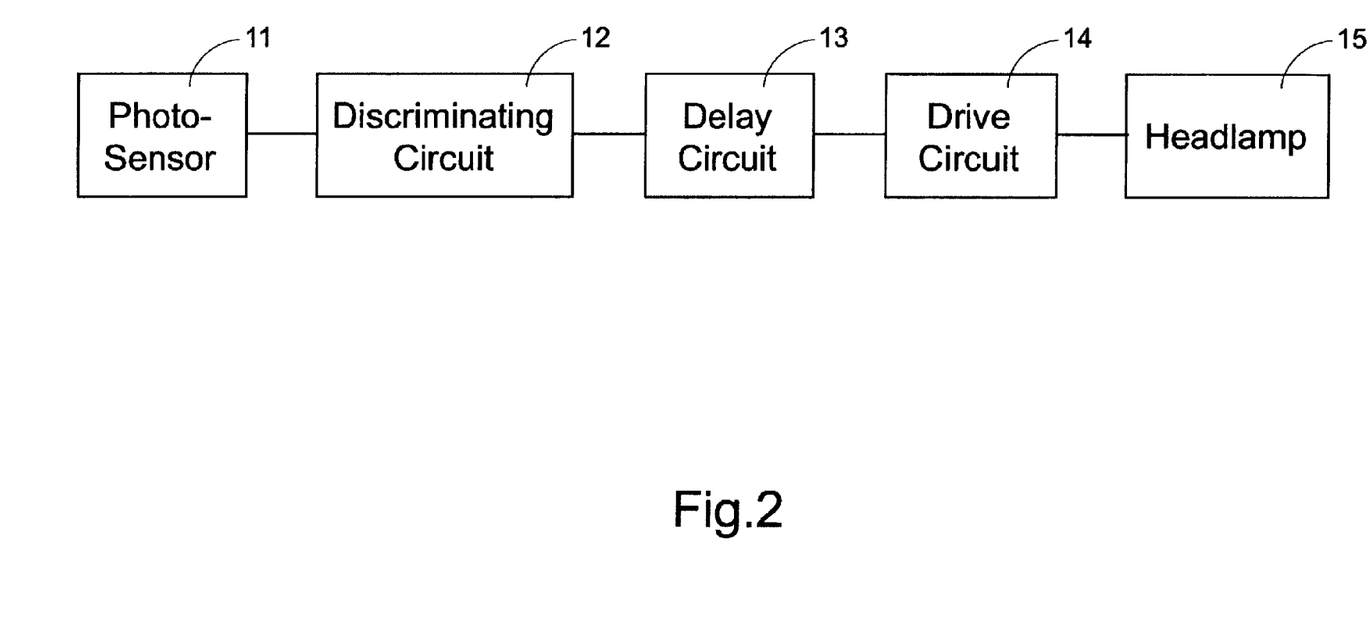
FIG. 2 is a block diagram schematically showing a preferred embodiment of a control device for automatically controlling a vehicular headlamp according to the present invention.

Please refer to FIG. 2 which is a block diagram schematically showing a preferred embodiment of a control device for automatically controlling a vehicular headlamp according to the present invention. The control device includes a photo-sensor 11, a discriminating circuit 12, a hold circuit 13 and a drive circuit 14. The photo-sensor 11 monitors the environmental conditions and generates a sensing signal indicative of the light intensity. The discriminating circuit compares the sensing signal with a reference signal to determine whether the environmental light intensity is below a threshold value, e.g. 1000 Lux. If the environmental light intensity is below the threshold value, a triggering signal will be generated to activate the headlamp 15. In order to avoid mis-operation problem encountered by the prior art, the hold circuit 13 allows the triggering signal to be outputted only after the triggering signal is uninterrupted for a predetermined period, e.g. 0.5 second. In other words, the triggering signal is transmitted to the drive circuit 14 by delaying 0.5 second. The drive circuit 14 provides a drive current for the headlamp 15 to emit a certain level of light in response to the triggering signal. It is to be noted that the hold circuit 13, although arranged between the discriminating circuit 12 and the drive circuit 14 for delaying the transmission of the triggering signal to the drive circuit 14 in this embodiment, may have alternative connection manner to delay the activation of the headlamp.

Figure 3:
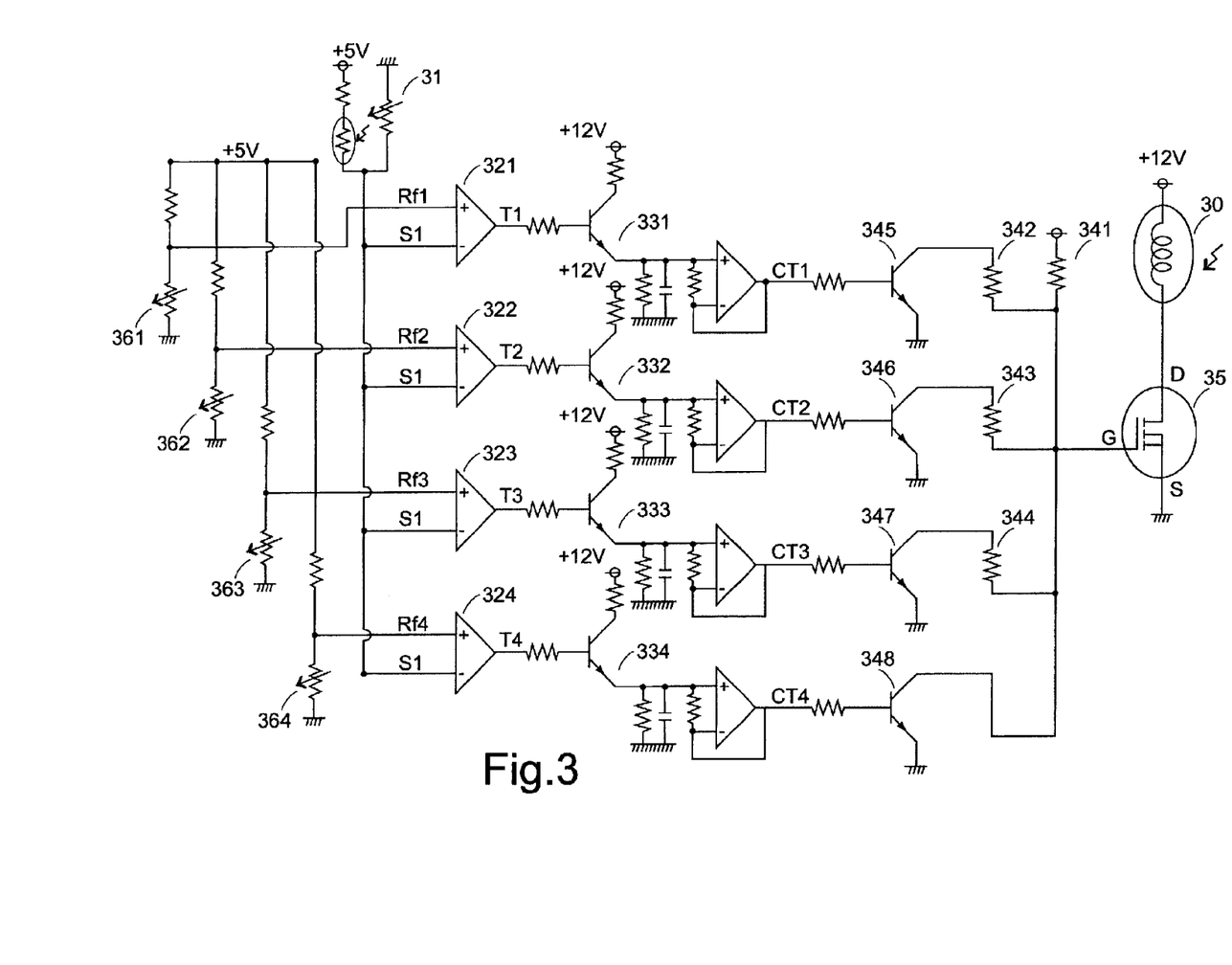
FIG. 3 is a schematic circuit diagram showing another embodiment of a control device for automatically controlling a vehicular headlamp according to the present invention.

Another embodiment of a control device for automatically controlling a vehicular headlamp according to the present invention is described as follows with reference to FIG. 3. The control device includes a photo-sensor 31, four comparing units 321, 322, 323 and 324, four hold units 331, 332, 333 and 334, a load resistor 341, three resistors 342, 343 and 344, four controlled switches 345, 346, 347 and 348, and a field effect transistor 35. In this embodiment, four comparing units are provided for determining four illumination levels of the headlamp.

The photo-sensor 31 detects the intensity of the environmental light, and generates a sensing signal S1 representing the intensity of the environmental light. The sensing signal S1 is inputted to each of the comparing units 321~324 to be compared with a first, a second, a third and a fourth reference signals Rf1, Rf2, Rf3 and Rf4, respectively. The variable resistors 361, 362, 363 and 364 are used for adjusting the reference signals Rf1, Rf2, Rf3 and Rf4, respectively. Each of the four comparing results respectively performed by the four comparing units 321~324 determines whether a respective triggering signal T1, T2, T3 or T4 is outputted. Different combination states of the four triggering signals will result in various activation states of the headlamp. In stead of direct transmission of the triggering signal(s) to the drive circuit to trigger the output of drive current of a certain level, the triggering signal(s) is outputted to respective hold units 331~334 electrically connected to the four comparing units 321~324, respectively. In response to the triggering signal T1, T2, T3 or T4 uninterrupted for a predetermined period, e.g. 0.5 second, a confirming signal CT1, CT2, CT3 or CT4 corresponding to the triggering signal T1, T2, T3 or T4 is generated by the corresponding hold unit 331, 332, 333 or 334. The confirming signals CT1, CT2, CT3 and CT4 enable the four controlled switches 345, 346, 347 and 348 to be conducted, respectively, so as to individually electrically connect the resistors 341~344 to ground. By differentiating the conduction states of the controlled switches resulting from various combination states of the confirmation signals, the field effect transistor 35 allows the drive current of different levels to be supplied to the headlamp 30.

For example, when the photo-sensor 31 detects that the intensity of the environmental light is greater than a threshold value, e.g. 1000 Lux, it means that the comparing results of the four comparing units 321~324 allow all the four triggering signals T1~T4 to be outputted. Therefore, the four controlled switches 345~348 are all conducted, and the load resistor 341 and resistors 342~344 are grounded, thereby providing no drive current for the headlamp 30. On the other hand, if the vehicle is traversing under a viaduct of about 5 meters in width in daytime, the environmental light intensity may be reduced for example to a level of about 890 Lux, thereby conducting only the first to the fourth controlled switches 345~347. In this case, a small drive current, e.g. 2.5A, is provided to result in a low level illumination of the headlamp. Like wise, with the decrease of the environmental light intensity, larger drive currents, e.g. 3.5A and 4A, can be provided for the headlamp to have higher illumination levels.

Figure 4:
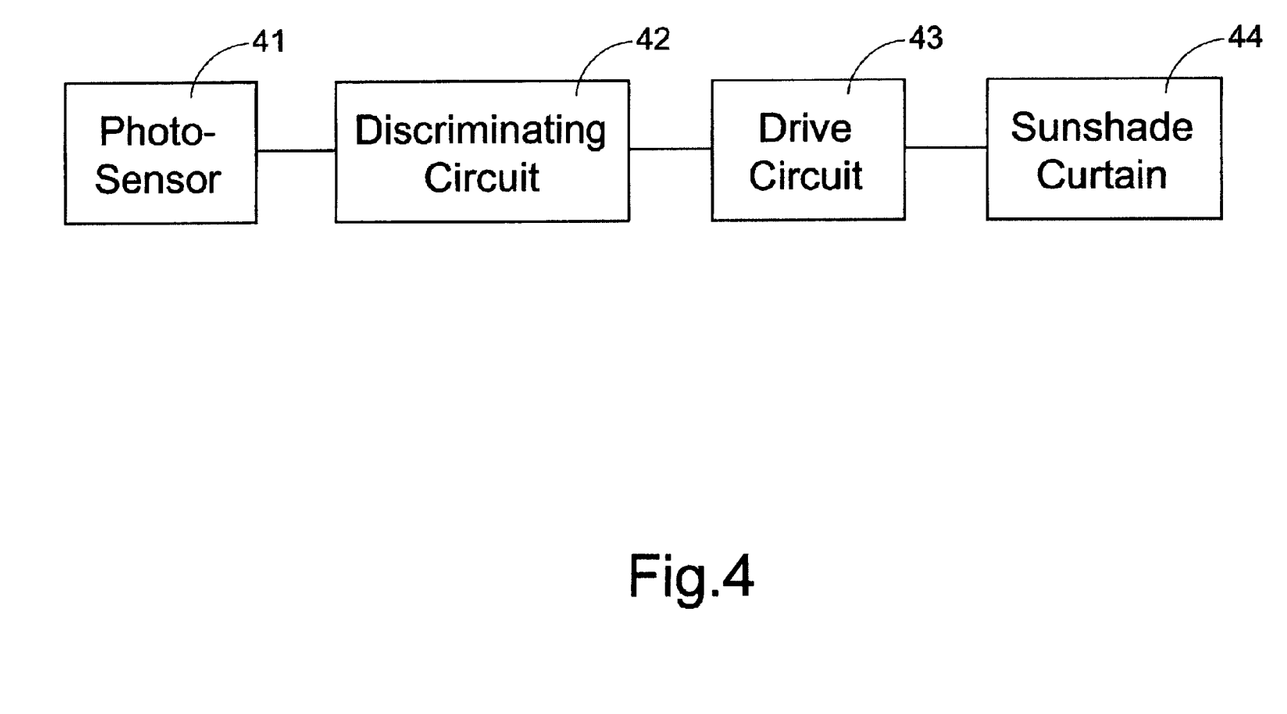
FIG. 4 is a block diagram schematically showing a preferred embodiment of a control device for automatically controlling a vehicular sunshade curtain according to the present invention.

Now, please refer to FIG. 4 which is a block diagram schematically showing a preferred embodiment of a control device for automatically controlling a vehicular sunshade curtain according to the present invention. The control device includes a photo-sensor 41, a discriminating circuit 42, a hold circuit 43 and a drive circuit 44. The photo-sensor 41 is similar to that included in the headlamp mentioned above, and preferably the same one so as to integrate the two control devices.

The photo-sensor 41 monitors the environmental conditions and generates a sensing signal indicative of the light intensity. The discriminating circuit 42 compares the sensing signal with a reference signal to determine whether the environmental light intensity is above a threshold value, e.g. 4000 Lux. If the environmental light intensity is above the threshold value, a triggering signal will be generated to open the sunshade curtain. The opening operation of the sunshade curtain is similar to the conventional ones, depending on the designs of the sunshade curtains. For example, in one embodiment, the open state indicates that a soft sunshade curtain drops from an upper position to cover the side window or rear windscreen, and the closed state indicates that the sunshade curtain rises and returns to the upper position. In another embodiment, the open state indicates that a rigid sunshade curtain ascends from a lower position to cover the side window or rear windscreen, and the closed state indicates that the sunshade curtain descends and returns to the lower position. For each case, a motor is generally used for transmitting the sunshade curtain. When the motor rotates in a first direction, e.g. clockwise, the sunshade curtain is opened. On the contrary, the sunshade curtain is closed by rotating the motor in a second direction, e.g. counter-clockwise.

In order to avoid mis-operation, the hold circuit 43 allows the triggering signal to be outputted only after the triggering signal is uninterrupted for a predetermined period, e.g. 10 seconds. In other words, the triggering signal is transmitted to the drive circuit 44 by delaying 10 seconds. It is to be noted that the hold circuit 43, although arranged between the discriminating circuit 42 and the drive circuit 44 for delaying the transmission of the triggering signal to the drive circuit 44 in this embodiment, may have alternative connection manner to delay the activation of the sunshade curtain.

Figure 5:
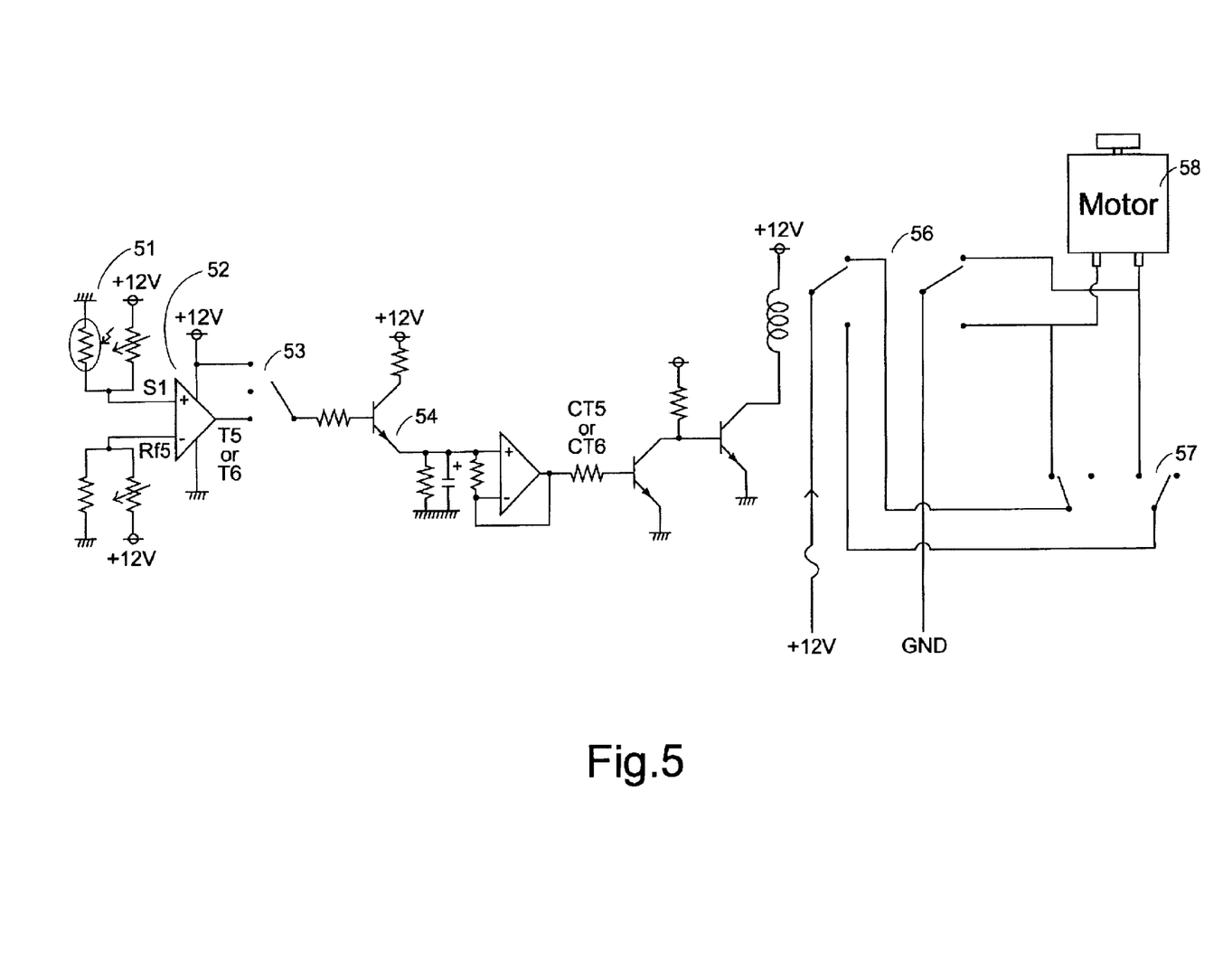
FIG. 5 is a schematic circuit diagram showing another embodiment of a control device for automatically controlling a vehicular sunshade curtain according to the present invention.

Another embodiment of a control device for automatically controlling a vehicular sunshade curtain according to the present invention is described as follows with reference to FIG. 5. The control device includes a photo-sensor 51, a comparing unit 52, an auto/manual switch 53, a hold circuit 54, a relay driver 55, a relay 56, and a suspending switch 57. In this embodiment, the auto/manual switch 53 is used for determining whether the sunshade curtain is to be automatically controlled in response environmental light, or manually controlled by the user. Once the user decides to have the sunshade curtain automatically controlled, a first or a second triggering signal will be outputted in response to the comparing result of the sensing signal S1 with the reference signal Rf5. If the comparing result indicates that the environmental light intensity is greater than a threshold value, e.g. 4000 Lux, a first triggering signal T5 is outputted to enable the open state of the sunshade curtain. If the comparing result indicates that the environmental light intensity is no greater than the threshold value, a second triggering signal T6 is outputted to enable the closed state of the sunshade curtain. In order to avoid mis-operation, the hold circuit 54 generates a confirming signal CT5 or CT6 in response to the first or the second triggering signal T5 or T6 uninterrupted for a predetermined period, e.g. 10 seconds. The relay driver 55 and the relay 56 thus allows the motor 58 of the sunshade curtain to rotate clockwise or counter-clockwise in response to the confirming signal CT5 or CT6. The suspending switch 57 is manipulated to control the relay to suspend the rotation of the motor, thereby allowing the sunshade to cover only a part of the windscreen.

Figure 6:
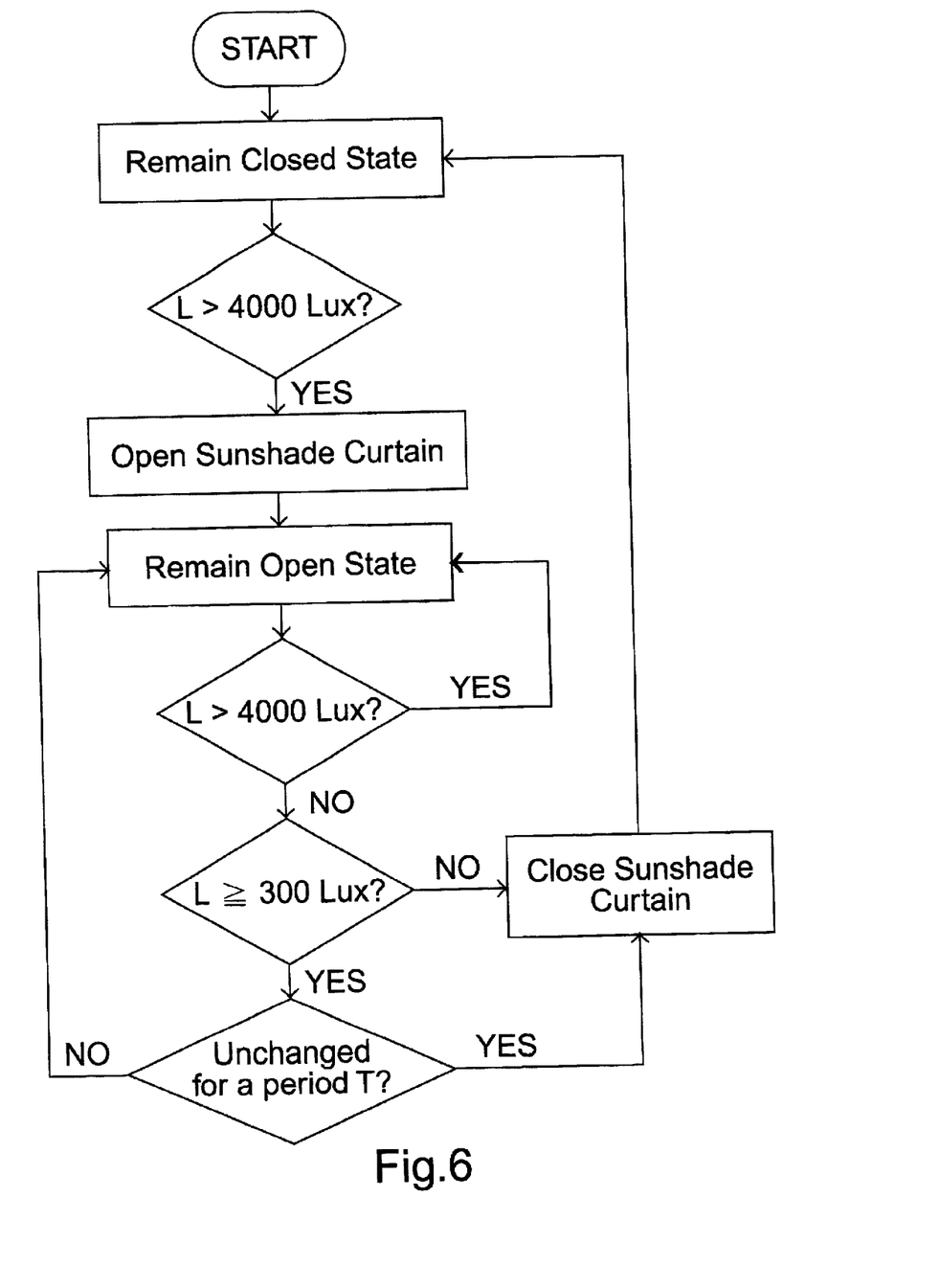
FIG. 6 is a flow chart illustrating a further embodiment of a controlling manner for automatically opening/closing a vehicular sunshade curtain according to the present invention.

Please refer to FIG. 6 which is a flow chart illustrating a further controlling manner for automatically opening/closing a vehicular sunshade curtain according to the present invention. First of all, the intensity of an environmental light is compared with a first and a second threshold values, e.g. 4000 Lux and 300 Lux, respectively. If the environmental light intensity is greater than 4000 Lux, the sunshade curtain will be automatically opened. If the environmental light intensity is no greater than 4000 Lux, the sunshade curtain remains closed. After the sunshade curtain has been opened, the environmental light intensity is kept on being compared with the threshold values. If the light intensity decreases to be a level lower than 4000 Lux, but higher than 300 Lux, the closing operation of the sunshade curtain will be delayed for a predetermined period, e.g. 5 minutes, in order to avoid mis-operation. However, if the light intensity is lower than 300 Lux, it will be required to have the sunshade curtain to be closed immediately to avoid involving in a dangerous situation.

It is clear from the above embodiments, the present invention provides a control device for automatically controlling a headlamp and/or a sunshade curtain of a vehicle in a safe, reliable and energy-effective way.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light-responsive control device, comprising:

a photo-sensor mounted on a vehicle for generating a sensing signal in response to the intensity of an environmental light;

a first discriminating circuit electrically connected to said photo-sensor for generating a first triggering signal in response to a first comparing result of said sensing signal with a first reference signal, and a second triggering signal in response to a second comparing result of said sensing signal with said first reference signal;

a first drive circuit electrically connected to said first discriminating circuit and a motor for opening a sunshade curtain of said vehicle in response to said first triggering signal, and closing said sunshade curtain in response to said second triggering signal;

a first hold circuit electrically connected between said first discriminating circuit and said first drive circuit for holding said second triggering signal until said second comparing result is kept unchanged for a predetermined period in minute order.

2. The light-responsive control device according to claim 1 wherein said photo-sensor is disposed at an interior rearview mirror of said vehicle.

3. The light-responsive control device according to claim 1 wherein said first drive circuit includes a relay unit electrically connected between said first discriminating circuit and said motor for changing revolving directions of said motor in response to said first and second triggering signal, respectively, so as to open/close said sunshade curtain.

4. The light-responsive control device according to claim 1 further comprising a switch electrically connected between said first discriminating circuit and said first drive circuit for switching said sunshade curtain among a manually opening, a manually dosing and an automatically opening/closing states.

5. The light-responsive control device according to claim 1 further comprising a switch electrically connected between said first drive circuit and said motor for manually suspending revolution of said motor.

6. A method for automatically switching a sunshade curtain of a vehicle between an open state and a closed state, comprising steps of comparing the intensity of an environmental light with a first and a second threshold values;

generating an open-state triggering signal when the intensity of said environmental light is greater than said first threshold value;

generating an closed-state triggering signal when the intensity of said environmental light is less than said second threshold value;

generating a confirmed closed-state triggering signal when the intensity of said environmental light is no greater than said first threshold value but no less than said second threshold value for a predetermined period;

switching said sunshade curtain to said open state in response to said open-state triggering signal, and keeping said oven state of said sunshade curtain unchanged until either of said closed-state triggering signal and said confirmed cloned-state triggering signal is asserted; and switching said sunshade curtain to said closed state in response to either of said cloned-state triggering signal and said confirmed closed-state triggering signal.

7. The method according to claim 6 wherein said first threshold value is 4000 Lux.

8. The method according to claim 6 wherein said second threshold value is 300 Lux.

9. The method according to claim 6 wherein said predetermined period is about 5 minutes.

* * * * *